United States Patent [19]

Hassel et al.

[11] Patent Number: 5,047,272

[45] Date of Patent: Sep. 10, 1991

[54] TRANSPARENT LAMINATES

[75] Inventors: Tillmann Hassel, Cologne; Hanns-Peter Müller, Bergisch-Gladbach, both of Fed. Rep. of Germany

[73] Assignee: Bayer Aktiengesellschaft, Leverkusen, Fed. Rep. of Germany

[21] Appl. No.: 446,941

[22] Filed: Dec. 6, 1989

[30] Foreign Application Priority Data

Dec. 21, 1988 [DE] Fed. Rep. of Germany ....... 3842966

[51] Int. Cl.$^5$ .................. G02B 5/30; B32B 17/10; B32B 27/40; B32B 27/32
[52] U.S. Cl. .................. 428/40; 428/423.1; 428/424.4; 428/425.6; 359/490
[58] Field of Search .................. 428/40, 423.1, 424.4, 428/425.6; 350/398

[56] References Cited

U.S. PATENT DOCUMENTS 4,174,240 11/1979 Muller .................. 428/339

Primary Examiner—Alexander S. Thomas
Attorney, Agent, or Firm—Sprung Horn Kramer & Woods

[57] ABSTRACT

Novel laminates comprise transparent polymers with a high content of hydroxyl groups as core layer and adhesive layers applied to one or both sides which are tack-free under normal conditions and which can accept an outer layer, thermoplastic polyurethane-polyureas having a substantially linear molecular structure with exclusively aliphatically or cycloaliphatically bonded urethane segments and urea segments and a content of urea groups —NH—CO—NH— of 1 to 20% by weight and a content of carboxyl groups —COOH bonded directly to the main chain of the molecule in lateral positions, of 0.001 to 10% by weight, being used as adhesive layers.

12 Claims, 1 Drawing Sheet

5,047,272

TRANSPARENT LAMINATES

BACKGROUND OF THE INVENTION

1. Field of the invention

The present invention relates to transparent laminates made from polymers having a high content of hydroxyl groups and special polyurethane-polyureas as adhesive layers (coupling agents), which laminates may furthermore bear different materials as outer layers.

Polymer films made from polyvinyl alcohol (PVAL) and from the copolymers with olefins are particularly outstanding in two valuable properties: they have a good barrier effect against oxygen and in the stretched state an outstanding orientation behaviour with incorporated foreign substances, such as iodine or dyestuffs. Due to the barrier effect, corresponding films are used as an integral component of packaging films, particularly for the preservation of foodstuffs. The orientation behaviour with incorporated foreign substances is used industrially for example in the production of polarizing films, where homopolymeric PVAL is superior to any other material.

On the other hand, a serious disadvantage of films of this type is their high sensitivity to moisture. Therefore, as a rule, industrial packaging and polarizing films with an active layer of PVAL have a multilayer construction; accordingly, depending on the intended application, PVAL films are laminated on one or both sides with protective films.

2. Description of the related art

In order to produce composite films of this type, it is necessary to bond the outer layer to the active layer (core layer). In the case of PVAL copolymers with a high polyolefin content (saponified ethylene-vinyl acetate (EVA) types) this bonding is achieved without any special intermediate layer, as described for example in JP 52/115,881 (1977), JP 62/46,643 (1987) and JP 62/46,644 (1987).

The lamination of saponified EVA types for producing packaging materials using special bonding layers, such as thermoplastic copolyester mixtures (EP 118,226) and modified polyolefins (JP 58/24,451 (1983); EP 186,894), is furthermore known.

A lamination by plasma treatment of the layers which are to be bonded is also possible with saponified EVA types (JP 61/280,930 (1986)).

The production of laminates with a pure (homopolymeric) polyvinyl alcohol active layer, as is customary for polarizing films is significantly more difficult. With polarizing films of this type the lamination serves chiefly to protect the active layer, which has been doped with iodine or dyestuff, against the effect of moisture; the laminated films are additionally bonded in use, for example in displays. An old method of achieving improved moisture characteristics in PVAL films. exploits the crosslinking reaction of the PVAL matrix with boric acid. This produces only unsatisfactory results however. Better results are obtained by coating the film with adhesive and crosslinkable organic systems. Examples of systems of this type are mixtures of epoxy resins with polyamides (JP 54/133,356 (1979) and JP 54/163,051 (1979)) and branched polyurethanepolyacrylates having unsaturated groups, which are crosslinked by UV radiation (JP 56/80,001 (1981) JP 55/36,862 (1980) and JP 55/12,930 (1980)).

Normally however, PVAL polarizing films are produced in the form of permanent laminates Epoxy resins curing with amines, acid anhydrides or polyamides are described as suitable for bonding the active layer (core layer) to the outer layer (DE-OS (German Published Specification) 1,594,044; U.S. Pat. No. 4,416,946). Acrylate systems too have also been used, monomeric or oligomeric systems with vinyl groups being used, which systems can be thermally, free-radically or photochemically cured after application of the outer layer (JP 56/33,610 (1981), JP 59/58,410 (1984), JP 59/48,714 (1984), JP 58/171,008 (1983)). JP 55/155,307 (1980) moreover describes, as bonding layer, mixtures of polyacrylates with phenolic resins, which are applied in solution. Finally, isocyanate adhesives (JP 53/47,696 (1978)) and polyurethanes (JP 60/159,704 (1985)) have also occasionally been used as the intermediate layer for the lamination.

The lamination methods of the prior art have various disadvantages. The adhesive layers used for packaging films are only suitable for bonding saponified EVA types and corresponding copolymers to other olefins, so that the very good barrier effect of pure (homopolymeric) PVAL cannot be fully exploited. Other disadvantages are present with polarizing films. The films which have been provided only with a moistureexcluding outer layer must be freshly bonded by means of an additional layer during incorporation, for example in displays, since the outer layer no longer has an adhesive effect. This disadvantage likewise exists with permanent laminates having a bonding (adhesive) layer and an outer layer. The bonding (adhesive) layers (epoxy and acrylic systems) used for laminating are moreover only suitable for immediate bonding with the outer layers, since monomers and oligomers are used which only produce a stable laminate after curing. Additionally, the chemical composition of the adhesive layers must in each case be optimized in relation to the outer layer, in order to produce a composite (laminate) of high quality.

Thus, until now, no coating has existed for PVAL, which protects the material against the effect of moisture, is tack-free under normal conditions, and so allows trouble-free transport of the film bearing an adhesive layer, and nevertheless allows bonding with conventionally used outer layers at any desired time without the additional application of further adhesive layers.

SUMMARY OF THE INVENTION

The invention relates to novel laminates made from transparent polymers having a high content of hydroxyl groups as the core layer and adhesive layers applied to one or both sides which are tack-free under normal conditions, and which can each accept an outer layer, the said laminates being characterized in that as adhesive layers, thermoplastic polyurethane-polyureas are used which have a substantially linear molecular structure with exclusively aliphatically or cycloaliphatically bonded urethane and urea segments and a content of urea groups —NH—CO—NH— of 1 to 20% by weight and a content of carboxyl groups —COOH bonded directly with the main chain of the molecule in lateral positions, of 0.001 to 10% by weight, all relative to the total weight of the polyurethane-polyureas.

DETAILED DESCRIPTION OF THE INVENTION

Figure 1:
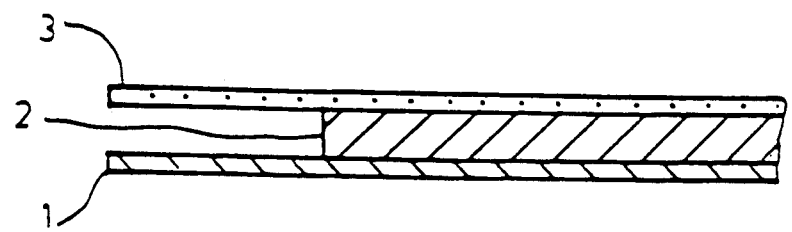
FIG. 1 shows a laminale comprising a core layer (1), an adhesive layer (2) and an outer layer (3).

Examples of polymers with a high content of hydroxyl groups as core layer for the laminates according to the invention are those which are accessible by polymerization of hydroxyalkyl (meth)acrylates or by polymerization of suitable (meth)allyl alcohol derivatives after splitting off protective groups. Homopolymers of vinyl esters or copolymers of these with olefins from which the corresponding polymers containing hydroxyl groups can be produced by saponification, are moreover suitable. Polymers of this kind containing hydroxyl groups may furthermore be weakly crosslinked by adding small amounts of (blocked) polyisocyanates, which do not affect their transparency. Saponified polymers containing vinyl acetate with a vinyl acetate content of 30 to 100 mol-% relative to all monomers and a degree of saponification of the vinyl acetate of 40 to 100%, preferably 50 to 100%, particularly preferably 60 to 100%, are preferably used as core layer for the laminates according to the invention. Here, the monomer content required to make up 100 mol-% relative to all monomers comprises one or more straight-chain or branched $C_2$-$C_8$-alkenes, alkenes, preferably $C_2$-$C_4$-alkenes, particularly preferably ethylene.

Since, at high olefin content, saponified EVA types as core layer for packaging materials may also be bonded by other means, and on the other hand the barrier effect increases with increasing content of hydroxyl groups and likewise with polarizing films a very high content of hydroxyl groups in the polymer of the core layer gives the best results, laminates which are preferred in the sense of the present invention are those whose core layer has relatively high vinyl acetate (VA) contents within the given range and relatively high degrees of saponification within the given range; VA homopolymers are therefore most particularly preferred, or EVA types with an olefin content of a maximum of 50 mol-% relative to all monomers, for example 50 to 0.1 mol-% of olefins, relative to all monomers. The degree of saponification is 70 to 100% relative to all VA (co)monomers.

Core layers made from (co]polymers containing vinyl acetate whose olefin content is less than 10 mol-% relative to all (co)monomers and whose degree of saponification exceeds 90% are most particularly preferably used.

When used for polarizing films, the core layer most particularly preferably comprises the polymer described with an extremely high vinyl acetate content (95–100 mol-%) and a very high degree of saponification 20 approaching 100% (95–100 mol-%), for example which comprises as far as possible saponified homopolyvinyl acetate (virtually pure polyvinyl alcohol). Core layers of this type are provided with dichroic dyestuffs and/or iodine and stretched beforehand or subsequently in order to achieve the polarizing effect, it being possible to add plasticizer for improved processability. It was found that even films which have been pre-treated in this way can be converted according to the invention into the laminates described without loss of their polarizing effect.

The core layer of the laminates according to the invention may bear adhesive layers applied to one or both sides made from the thermoplastic polyurethane-polyurea described further below. Laminates with adhesive layers applied to both sides are preferred in the sense of a protection for the core layer having a high content of hydroxyl groups, but applications are also possible in which an adhesive layer applied to one side is required, since the other side of the core layer is protected by other means or should remain accessible.

The laminates according to the invention can accept an outer layer on each adhesive layer. Outer layers of this type are generally transparent like the core layer and comprise for example silicate glass or a transparent plastic, it being possible for the outer layers accepted by both sides to comprise identical or different materials. Examples of transparent plastics of this type are aromatic polyesters, polyacrylonitrile (PAN), poly(meth)acrylates (PMMA), polysulphones, aromatic polycarbonates (PC), cellulose esters, such as. cellulose acetate (CA), cellulose acetate butyrate (CAB) or cellulose acetate propionate (CAP) or polyamides (PA) and furthermore polyheterocycles, such as polyhydantoins, polyimides, polyamideimides, polyparaphenylenebenzo-bisimidazoles and polyparaphenylenebenzo-bis-oxazoles.

Outer layers made from aroma(ic polyesters, polyamides, aromatic polycarbonates, poly(meth)acrylates, cellulose esters and silicate glass are preferably used.

Aromatic polycarbonates, poly(meth)acrylates or cellulose triacetates and silicate glass are preferably used as the outer layer applied to one or both sides.

The use of special polyurethane-polyureas as adhesive layer(s) is essential to the laminates according to the invention. These special, transparent and highly light-fast thermoplastic polyurethane-polyureas have a substantially linear molecular structure and urethane segments and urea segments which are exclusively bonded aliphatically or cycloaliphatically; they are distinguished by having (a) a content of urea groups —NH—CO—NH— of 1 to 20% by weight, preferably 2 to 10% by weight and (b) a content of carboxyl groups -COOH bonded directly to the main chain of the molecule in lateral positions, of 0.001 to 10% by weight, preferably 0.008 to 6% by weight, all relative to the total weight of the polyurethane-polyureas.

Polyurethane-polyureas of this type have been disclosed in DE-OS (German Published Specification) 2,644,434 and in the equivalence thereto, U.S. Pat. No. 4,166,149, U.S. Pat. No. 4,174,240 and U.S. Pat. No. 4,254,176. They impart an excellent adhesion between polymers with a high content of hydroxyl groups and glass and many transparent plastics, such as those which have been mentioned above for the core layer and the outer layers.

Moreover, they have a good barrier effect against water, which is seen from the outstanding edge stability of the corresponding laminates in the boiling test, and under normal conditions are tack-free. These requirements correspond superlatively with the range of requirements for an adhesive layer for special PVAL core layers having a high content of hydroxyl groups, which until now has not been disclosed and did not appear to be possible from the previous fields of application, since the plastics hitherto laminated with the said adhesive layer differ significantly in their surface properties from the core layers used according to the invention made from transparent polymers having high contents of hydroxyl groups.

Known aliphatic one-component and two-component catalysed polyurethane adhesives are normally unsuitable as adhesives for the lamination of polymers having a high content of hydroxyl groups. It was therefore extremely surprising and unforeseeable to those skilled in the art in view of the known problems of laminating polymers, such as PVAL, with a high content of hydroxyl groups, that the polyurethane-polyureas mentioned above, which are specially optimized for laminating glass and transparent plastics which are free from hydroxyl groups, can also be used for laminating polymers having high contents of hydroxyl groups. Accordingly, the invention comprises, using the polyurethane-polyureas described above as adhesive layers by which glass clear laminated layered materials (laminates) are accessible, in which the core layer comprises a polymer having a high content of hydroxyl groups and which are distinguished by having good adhesion of the various parts of the laminate (core layer, adhesive layer(s) and outer layer(s)).

The preparation of the polyurethane-polyureas which are to be used according to the invention is carried out for example according to the prepolymer principle, i.e., by reacting an excess of a suitable diisocyanate with dihydroxy compounds to form the corresponding prepolymers having isocyanate groups in terminal positions, and subsequently extending the chain of these prepolymers using diamine chain extension agents. Here, if desired, monofunctional reactants may be used concomitantly in small amounts as chain terminators in order to control the molecular weight and thus to adjust the physical properties of the polymer. In general, the type and relative proportions of the structural components are selected in such a way that a calculated molecular weight between 10,000 and 500,000, preferably between 20,000 and 200,000 results. In the preparation of the polyurethane-polyureas which are to be used according to the invention, the bifunctional structural components are generally used in amounts such that 1.1 to 4, preferably 1.2 to 3 isocyanate groups and 0.1 to 3, preferably 0.2 to 2 amino groups of the chain extension agent are utilized per hydroxyl group of the alcoholic structural component.

Suitable diisocyanates for the preparation are those having aliphatically and/or cycloaliphatically bonded isocyanate groups of the formula Q(NCO)$_2$, in which Q represents an aliphatic hydrocarbon radical having 2 to 12 carbon atoms or a cycloaliphatic or mixed aliphatic-cycloaliphatic hydrocarbon radical having 4 to 15 carbon atoms. Examples of diisocyanates of this type are ethylene diisocyanate, tetramethylene diisocyanate, hexamethylene diisocyanate, dodecamethylene diisocyanate, cyclobutane-1,3-diisocyanate, cyclohexane-1,3- and -1,4-diisocyanate, 4,4'-diisocyanatodicyclohexylmethane or 1-isocyanato-3,3,5-trimethyl-5-isocyanatomethyl-cyclohexane (isophorone diisocyanate) or any desired mixtures of diisocyanates of this type. Cycloaliphatic or mixed aliphatic-cycloaliphatic diisocyanates, particularly preferably isophorone diisocyanate, are preferably used.

The alcoholic structural components comprise
(i) the higher molecular weight diols known per se from polyurethane chemistry, in the molecular weight range 300 to 6,000, preferably 800 to 1,000,
(ii) dihydroxycarboxylic acids of the formula

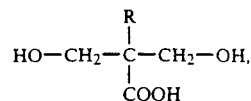

in which
R represents hydrogen or a $C_1$–$C_4$-alkyl radical and optionally
(iii) low molecular weight aliphatic or cycloaliphatic diols, preferably in the molecular weight range 62 to 300.

The relative proportions of the individual components (i), (ii) and (iii), which may be reacted simultaneously or successively with the isocyanate component, are here preferably selected in such a way that 0.01 to 12 hydroxyl groups of component (ii) and 0 to 10 hydroxyl groups of component (iii) are present per hydroxyl group of component (i). Component (i) may comprise the polyester diols, polyether diols, polythioether diols, polyacetal diols or polyesteramide diols known per se. The polyester diols or polyether diols known per se from polyurethane chemistry are preferably used. Their preparation and composition is known to those skilled in the art.

Component (ii) of the formula mentioned may for example comprise dimethylolacetic acid, α,α-dimethylolpropionic acid or α,α-dimethylol-n-valeric acid. α,α-Dimethylolpropionic acid is preferred. Component (iii) may also comprise glycols of the type known to those skilled in the art.

Suitable diamine chain extension agents are preferably aliphatic, cycloaliphatic or mixed aliphaticcycloaliphatic diamines having primary amino groups, in the molecular weight range 60 to 300. Examples thereof are ethylenediamine, tetramethylenediamine, hexamethylenediamine, 4,4'-diaminodicyclohexylmethane, 1,4-diaminocyclohexane, 4,4'-diamino-3,3'-dimethyl-dicyclohexylmethane or 1-amino-3,3,5-trimethyl-5-aminomethylcyclohexane (isophoronediamine). 4,4'-Diaminodicyclohexylmethane or isophoronediamine are preferably used.

For adjusting to the desired molecular weight, monofunctional reactants (chain terminators) are generally used concomitantly in amounts of 0.05 to 3, preferably 0.1 to 1% by weight, relative to the total amount of structural components. Examples of monofunctional reactants which may be mentioned are: monoisocyanates, such as methyl isocyanate; monoalcohols, such as methanol, ethanol, butanol, tert-butanol, octanol, isopropanol, cyclohexanol; monoamines, such as methylamine, butylamine, dibutylamine.

The preparation of the polyurethane-polyureas which are to be used in the laminates according to the invention as adhesive layers is generally carried out in the prepolymer stage at about 80° to 150° C. The end point of the reaction is determined by NCO titration. After formation of the prepolymer the chain extension reaction is then carried out with the diamine chain extension agent either in the melt or in solution, suitable solvents for this purpose being known to those skilled in the art. The chain extension reaction may be carried out particularly advantageously in heated reaction extruders. In order to carry out the chain extension reaction, adjustment is made to a temperature of 120° to 300° C., preferably 150° to 250° C.

The thickness of the adhesive layers in the laminates according to the invention is adjustable within any desired limits and is not critical to the invention. Thicknesses of 0.5 μm to 5 mm may be mentioned for example. Portions of this range are preferable depending on the application of the laminates Thus, for polarizing films, displays and optical elements adhesive layer thicknesses of 0.5 to 50 μm, preferably 0.5–20 μm, are used, while for packaging purposes thicknesses of 20 μm–5 mm, preferably 50 μm to 1 mm are suitable. Adhesive layers of this type may be produced by known film extrusion processes or else by pouring solutions of polyurethane-polyureas in suitable solvents, for example in methylene chloride or in a toluene/isopropanol mixture via casting machines onto smooth, poorly adhering bases and evaporating the solvent. The adhesive layers may subsequently be pulled off these smooth, poorly adhering bases.

The bond between the core layer and the adhesive layer(s) may as a general principle be produced by applying the molten polyurethane-polyureas (flame lamination) or by pouring on a polyurethane-polyurea solution directly. The bond may also be produced however by coextrusion of core and adhesive layer(s). The polyurethane-polyureas which are to be used have melting points in the range of 60° to 180° C. and may consequently be coextruded or flame laminated in the temperature range or above (up to 250° C.). Separately produced adhesive layers may moreover be applied for instance by partial dissolution.

In the case of laminates according to the invention bearing outer layers it is accordingly possible to operate in such a way that an adhesive layer is applied as a solution to the core layer, the adhesive layer being ready for use after evaporation of the solvent. This operation may optionally be repeated on the other side of the core layer. One or two outer layers may then simultaneously or successively be applied to this core layer laminated on one or both sides. The bond is produced by heating of this sandwich to the melting point of the adhesive layer under the simultaneous influence of a pressure of 5 to 50 bar. However, it is also possible to operate in such a way that one or two outer layers are laminated with one of the polyurethane-polyureas described by pouring on a solution or by coextrusion and that by insertion of a core layer, a laminate is produced with the composition for example outer layer/adhesive layer/core/adhesive layer/outer layer. It is also possible to product a laminate of this type by stacking the individual, separately produced layers and bonding them to form a laminate, taking account of the given temperature and pressure parameters. The laminates according to the invention which initially comprise only the core layer and one or two adhesive layers are particularly superlatively suitable for the production of extended laminates already mentioned in which the intended outer layers are only applied later however in the course of a separate use of these laminates. In such cases a laminate according to the invention, which for example has the construction adhesive layer/core layer/adhesive layer is protected from contamination and thus prepared for transport by lamination on both sides with a poorly adhering, removable outer film, of polyethylene or silicone-treated paper, for example.

In addition to bonding under pressure at elevated temperature it is also possible to swell the polyurethane-polyurea adhesive layers with a suitable solvent, for example methylene chloride or tetrahydrofuran, by which after applying further layers of the multilayer laminate described above, likewise under pressure but without the application of elevated temperature, a bond can be produced.

The applicational possibilities of the laminates according to the invention are determined by the range of properties of the core layer. This range of properties is not altered within the laminates according to the invention. The invention therefore relates furthermore to the use of the laminates according to the invention for the production of polarizing films, displays and optical elements. The invention furthermore relates to the use of the laminates according to the invention for the production of packagings.

EXAMPLE 1 (according to DE-OS (German Published Specification) 2,644,434)

Preparation of a polyurethane-polyurea in the molten state (A) 70 kg (31.2 mol) of a linear 1,4-butanediol polyadipate with terminal OH groups and an average molecular weight of about 2,200 and 34.7 kg (156.3 mol) of 1-isocyanato-3-isocyanatomethyl3,3,5-trimethylcyclohexane (isophorone diisocyanate) were stirred overnight at 60° C. under nitrogen in a vessel fitted with a stirrer. 7.5 kg (83.3 mol) of 1,4-bulanediol and 1.4 kg (10.45 mol) of dimethylol-propionic acid were then added and stirring was continued at 100° C. for a further 2 hours. A content of free NCO groups of 2.2% was subsequently found.

(B) 600 g (0.313 mol) per second of the NCO prepolymer produced according to procedure A) and 26.6 g (0.313 mol) per second of isophoronediamine were continuously metered via separate lines into the feed funnel of a commercially available heated twin-screw reaction extruder. The screw flights were fitted with conveying and kneading elements. The ratio of the length to the diameter of the flights was about 40. At a rotational speed of 200 min$^{-1}$, melt temperatures of 120° to 200° C. were measured over the length of the machine. The molten product was quenched in a water bath, then freed from adhering water with compressed air, and granulated. The reaction product occurred in the form of a colourless, glass-clear resin and had an —NH—CO—NH— content of 2.46% by weight. The —COOH content was 0.4% by weight.

EXAMPLE 2

The polyurethane-polyurea (PU-polyurea) according to Example 1 was dissolved in methylene chloride to form a 5% strength solution. The solution produced was spread with a doctor blade on both sides of a 10 μ thick PVA cast film (Mowiol ® 28-99 from Hoechst) in a layer thickz ness of 400 μ (as solution). After evaporating off the solvent a glass-clear laminate was obtained having a total thickness of 40 μ.

EXAMPLE 3

The 10 μ) thick PVA film from Example 2 was coated on both sides with PU-polyurea using a doctor blade analogously with Example 2. Then, in each case, a 40 μ thick bisphenol A-polycarbonate cast film (Makrolon ® 5700 from Bayer AG) was applied to the PU-polyurea layers. The sandwich prepared in this manner was heated to 150° C. and pressed at this temperature for 5 min at a pressure of 40 bar. A transparent laminate 90 μ in thickness resulted. The peel strength of a 10 mm wide strip of the composite film was determined as 2N at a peeling angle of 90° and a pulling speed of 100 mm min$^{-1}$.

Figure 2:
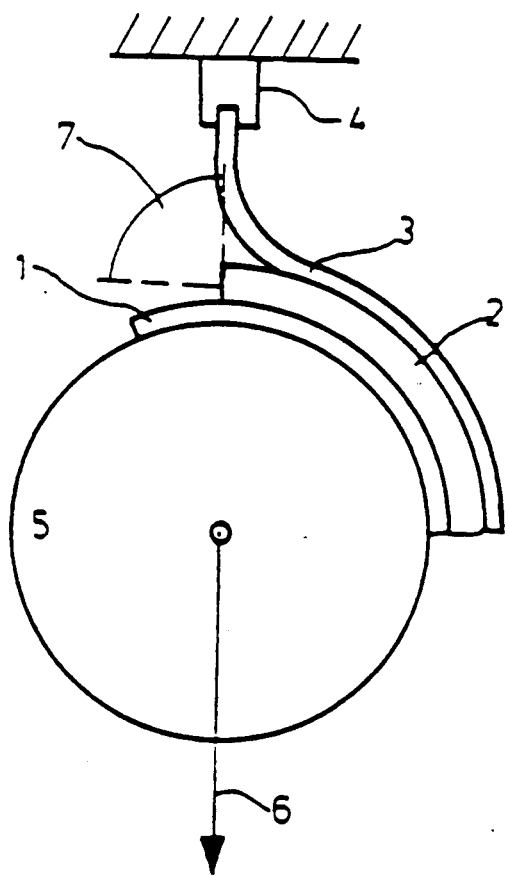
FIG. 2 shows the principle of measuring the peel strength necessary for delamination of the outer layer (3) from the adhesive layer (2).

In order to measure the peel slrength a laminate was produced provided with an adhesive layer and an outer layer on one side only, lhe said laminate comprising according to FIG. 1, the core layer (1), the adhesive layer (2) and the outer layer (3). In this case the adhesive layer was not completed up to the leading edge of (1) and (3). In accordance with FIG. 2, the core layer (1) was bonded to the surface of a roll (5) and the outer layer (3) was clamped to a rigidly mounted gripping device (4). The roll which was capable of rotation about its axis was now displaced from the gripping device (4) with a velocity of 100 mm min in the direction of the vector (6). In this process, a delamination angle (peeling angle) of 90° occurs. The force necessary to maintain the given peeling speed was measured. The greater the necessary force (peel strength), the better is the adhesion between adhesive layer (2) and the outer layer (3) and/or the core layer (1).

EXAMPLE 4

The PVA film laminated on both sides with PU-polyurea, from Example 2, was laid between a 2 mm thick glass sheet and a 1 mm thick bisphenol A-polycarbonate sheet (Makrolon ® 3103). The sandwich was pressed analogously with Example 3. In the separation test on the composite sheet obtained, delamination occurred with destruction of the PVA layer and even with destruction of the glass sheet in large regions; i.e. a thin glass layer was torn from the glass sheet.

EXAMPLE 5

The 10 μ thick PVA film from Example 2 was coated on both sides with PU-polyurea using a doctor blade analogously with Example 2. A 20 μ thick PET film was laid in each case on the PU-polyurea layers and pressed for 5 min at 150° C. and 30 bar. A 70 μ thick laminate was obtained with a peel strength of 1.2 N determined analogously with Example 3.

EXAMPLE 6

The PVA film laminated on both sides with PU-polyurea, from Example 2, was laid between two 20 μ thick polymethylmethacrylate (PMMA) cast films. The sandwich was pressed for 5 min at 150° C. and 30 bar. A 70 μ thick clear laminate resulted with PMMA outer layers. A peel strength could not be determined, since during the separation test the outer layers which projected (in order to apply the method of measurement) tore as soon as tension was applied, without delamination occurring.

EXAMPLE 7

A laminate with a PVA core layer, a PU-polyurea adhesive layer and a cellulose acetate butyrate outer layer was produced analogously with Example 6. A peel strength of the composite could not be measured, since during the separation test, as in Example 6, the outer layer tore under tension at the beginning of the composite without delamination occurring.

EXAMPLE 8

The 5% strength methylene chloride solution of the polyurethane-polyurea from Example 1 was applied with a doctor blade to a 20 μ thick PET film (DF 21 from Teijin) in a layer thickness of 400 μ. After evaporation of the solvent a 0.7 mm thick, slightly crosslinked ethylene-vinyl acetate (EVA) film (70% ethylene, 30% vinyl acetate) with a degree of saponification >99% was laid onto the PU-polyurea layer. This film was obtained by blending 90% by weight of the almost completely saponified EVA described with 10% by weight of a commercially available blocked polyisocyanate and melting this mixture on a heated plate to form the film, crosslinking simultaneously occurring. This sandwich was further coated on the EVA side with a PTFE release film. By pressing the saponified EVA layer at a temperature of 120 to 150° C. and then pulling off the release film, a transparent laminate was obtained with a peel strength of 1.2N, determined as in Example 3.

EXAMPLE 9

A 600 μ thick film was cast from a 10% strength solution of a bisphenol A-polycarbonate (Makrolon ® 5700) in methylene chloride. After evaporation of the solvent, this film was coated with 400 μ of a 5% strength solution of the polyurethane-polyurea from Example 1, using a doctor blade. By laying the saponified EVA film used in Example 8 on the polyurethane layer and pressing as in Example 8, a PC/(PU-polyurea)-EVA laminate was obtained with a peel strength of 1.0N determined analogously with Example 3. Tearing of the Makrolon film occurred in the peel test.

EXAMPLE 10 (USE EXAMPLE)

A polyvinyl alcohol film (Mowiol ® 28 - 99 from Hoechst AG) coloured with 2% Direct Red 81 (Siriusrot 4 B from Bayer AG) was stretched by 680%. The stretched 7 μ thick film was laid between the PU-polyurea sides of two 2 mm glass sheets which had been coated on one side to a layer thickness of 400 μ with the PU-polyurea solution given in Example 2, using a doctor blade and dried. The sandwich was exposed for 5 min to a temperature of 150° C. and a pressure of 30 bar. A polarizer for light of wavelength 510 nm resulted having the following properties:

| | |
|---|---|
| - transmission of unpolarized light: | 37.40% |
| - degree of polarization: | 99.82%. |

What is claimed is:

1. A laminate comprising a transparent polymer having a high content of hydroxyl groups as the core layer and an adhesive layer applied to one or both sides which is tack-free under normal conditions, and which can each accept an outer layer, wherein in said laminates as adhesive layers, a thermoplastic polyurethane-urea is used which has a substantially linear molecular structure with exclusively aliphatically or cycloaliphatically bonded urethane and urea segments and a content of urea groups —NH—CO—NH— of 1 to 20% by weight and a content of carboxyl groups —COOH bonded directly with the main chain of the molecule in lateral positions, of 0.001 to 10% by weight, all relative to the total weight of the polyurethane-polyurea.

2. The laminate of claim 1, wherein the core layer with a high content of hydroxyl group is a saponified polymer containing vinyl acetate with a vinyl acetate content of 30 to 100 mol-% relative to all monomers and a degree of saponification of 40 to 100%.

3. The laminate of claim 2, wherien the degree of saponification is 50 to 100%.

4. The laminate of claim 3, wherein the degree of saponification is 60 to 100%.

5. The laminate of claim 2, wherein the monomer content required to make up 100 mol-% comprises one or more straight-chain or branched $C_2$-$C_8$-alkenes.

6. The laminate of claim 5, wherein the monomer content required to make up 100 mol-% comprises one or more straight-chain or branched $C_2$-$C_4$-alkenes.

7. The laminate of claim 6, wherein the monomer content required to make up 100% comprises ethylene.

8. The laminate of cliam 1, wherein an adhesive layer is applied on both sides.

9. The laminate of claim 1, wherein the outer layers accepted by the adhesive layers comprise a component selected from the group consisting of silicate glass, transparent plastics and combinations of silicate glass and transparent plastics.

10. The laminate of claim 9, wherein the transparent plastics are those from the categories of aromatic polyesters, polyamides, polysulphones, polyheterocycles, aromatic polycarbonates, poly(meth)acrylates, polyacrylonitriles or cellulose esters.

11. The laminate of claim 1, wherein the polymer of the core layer having high contents of hydroxyl groups also contains at least one additive selected from the group consisting of dichroic dyestuffs and iodine, and is stretched beforehand or subsequently.

12. The laminate of claim 1, wherein the adhesive layer is provided with an easily removable protective layer until the incorporaction of an outer layer.

* * * * *